United States Patent
Bronfenbrenner et al.

(10) Patent No.: US 9,452,578 B2
(45) Date of Patent: Sep. 27, 2016

(54) FAST FIRING METHOD FOR HIGH POROSITY CERAMICS

(71) Applicant: CORNING INCORPORATED, Corning, NY (US)

(72) Inventors: David Jack Bronfenbrenner, Painted Post, NY (US); Luan Trong Nguyen, Lindley, NY (US); Elizabeth Marie Vileno, Corning, NY (US)

(73) Assignee: Corning Incorporated, Corning, NY (US)

( * ) Notice: Subject to any disclaimer, the term of this patent is extended or adjusted under 35 U.S.C. 154(b) by 211 days.

(21) Appl. No.: 13/951,840

(22) Filed: Jul. 26, 2013

(65) Prior Publication Data
US 2015/0028528 A1    Jan. 29, 2015

(51) Int. Cl.
| | |
|---|---|
| *C04B 35/478* | (2006.01) |
| *C04B 38/06* | (2006.01) |
| *C04B 35/64* | (2006.01) |
| *B29D 24/00* | (2006.01) |
| *C04B 38/00* | (2006.01) |

(52) U.S. Cl.
CPC .......... *B29D 24/005* (2013.01); *C04B 35/478* (2013.01); *C04B 35/64* (2013.01); *C04B 38/0006* (2013.01); *C04B 2235/3206* (2013.01); *C04B 2235/3445* (2013.01); *C04B 2235/6562* (2013.01); *C04B 2235/6584* (2013.01); *C04B 2235/661* (2013.01)

(58) Field of Classification Search
CPC ............ C04B 35/478; C04B 38/0006; C04B 2235/6562
See application file for complete search history.

(56) References Cited

U.S. PATENT DOCUMENTS

| | | | |
|---|---|---|---|
| 6,225,733 B1 | 5/2001 | Gadkaree et al. ............ | 313/352 |
| 6,541,407 B2 | 4/2003 | Beall et al. | |

(Continued)

FOREIGN PATENT DOCUMENTS

| | | |
|---|---|---|
| CN | 103517885 | 1/2014 |
| EP | 203957 | 3/2009 |

(Continued)

OTHER PUBLICATIONS

Patent Cooperation Treaty International Notification of Transmittal of the International Search Report and The Written Opinion of the International Searching Authority, international application No. PCT/US2014/020202; mailing date May 15, 2014, 10 pages.

(Continued)

*Primary Examiner* — Erin Snelting
(74) *Attorney, Agent, or Firm* — Joseph M. Homa; Matthew B. McNutt (57) ABSTRACT

A method for firing a green honeycomb ceramic body including heating the green honeycomb ceramic body from room temperature to a first temperature of less than or equal to about 350° C. with at least one heating rate of greater than or equal to about 80° C./hr. The green honeycomb ceramic body may be heated from the first temperature to a second temperature of greater than or equal to about 800° C. at a heating rate of greater than or equal to about 90° C./hr. The green honeycomb ceramic body may be heated from the second temperature to a third temperature of greater than or equal to about 1000° C. The green honeycomb ceramic body may include aluminum raw materials for forming an aluminum titanate ceramic body.

23 Claims, 1 Drawing Sheet

(56) References Cited

U.S. PATENT DOCUMENTS

| | | |
|---|---|---|
| 7,976,768 B2 | 7/2011 | Brady et al. |
| 2006/0089252 A1 | 4/2006 | Coates et al. ................. 502/150 |
| 2007/0006561 A1 | 1/2007 | Brady et al. .................... 55/523 |
| 2007/0254798 A1 | 11/2007 | Addiego et al. ............. 501/119 |
| 2007/0265161 A1 | 11/2007 | Gadkaree et al. ............ 502/417 |
| 2008/0051554 A1 | 2/2008 | Coates et al. ................. 528/405 |
| 2009/0298667 A1 | 12/2009 | Addiego et al. ................ 501/39 |
| 2009/0298670 A1 | 12/2009 | Murtagh et al. |
| 2013/0269303 A1* | 10/2013 | Uoe ..................... C04B 35/478 55/523 |
| 2014/0252695 A1 | 9/2014 | Beall et al. |

FOREIGN PATENT DOCUMENTS

| | | |
|---|---|---|
| WO | 2004/011124 | 2/2004 |
| WO | 2006/130759 | 12/2006 |
| WO | 2012/057142 | 5/2012 |
| WO | 2012/074944 | 6/2012 |
| WO | 2014/138015 | 9/2014 |

OTHER PUBLICATIONS

Patent Cooperation Treaty International Notification of Transmittal of the International Search Report and The Written Opinion of the International Searching Authority, international application No. PCT/US2014/047720; mailing date Nov. 10, 2014, 9 pages.

Patent Cooperation Treaty International Notification of Transmittal of the International Search Report and The Written Opinion of the International Searching Authority, international application No. PCT/US2014/047713; mailing date Nov. 27, 2014, 11 pages.

EP14710764.3 Search Report Mailed October 30, 2015.

\* cited by examiner

FAST FIRING METHOD FOR HIGH POROSITY CERAMICS

BACKGROUND

1. Field

The present disclosure generally relates to firing green ceramic bodies and, more specifically, to firing aluminum titanate ceramic bodies.

2. Technical Background

Ceramic filters, particularly large frontal area filters, include organic raw materials that should be removed in the firing process. Such organic materials may be contained in, for example, binders (Methocel, polyvinyl alcohol, etc.), lubricants, dispersant, pore formers (starch, graphite, and other polymers). These materials may be burned out in the presence of oxygen at temperatures above their flash points. Some of these materials are also removed as volatile organic compounds (VOC) that are burned in a kiln and/or in an after-treatment apparatus, such as a thermal oxidizer. The decomposition and/or oxidation of these materials usually release heat and often influence shrinkage or growth of the material, which may cause stresses and may ultimately lead to cracking.

Conventional firing processes for large or heavy duty ceramic bodies rely on firing cycles with slow heating rates, such as 4° C./hr to 8° C./hr, when heating to a temperature below 600° C. These low heating rates allow the raw organic raw materials to be removed gradually and completely, thereby reducing the stress in the ceramic material. However, firing cycles are prolonged by using these low heating rates, as it may take up to 130 hours to heat the green ceramic body to 600° C., and, as a result, the entire firing cycle may take from 140 hours to 198 hours.

Accordingly, a need exists for a firing cycle with increased heating rates, particularly heating rates up to 600° C. that does not cause cracking in the ceramic body.

SUMMARY

According to embodiments, methods for firing a green honeycomb ceramic body are disclosed. The methods may comprise heating the green honeycomb ceramic body from room temperature to a first temperature of less than or equal to about 350° C., wherein heating the green honeycomb ceramic body from room temperature to the first temperature comprises a heating rate of greater than or equal to about 80° C./hr. The green honeycomb ceramic body may be heated from the first temperature to a second temperature of greater than or equal to about 800° C., wherein heating the green honeycomb ceramic body from the first temperature to the second temperature comprises heating at a heating rate of greater than or equal to about 90° C./hr. The green honeycomb ceramic body may then be heated from the second temperature to a third temperature of greater than or equal to about 1000° C. The green honeycomb ceramic body may have a diameter of from greater than or equal to about 4.0 inches to less than or equal to about 9.0 inches. The green honeycomb ceramic body may comprise a carbon-based pore former in a concentration of from greater than or equal to about 10% to less than or equal to about 48% by weight. The green honeycomb ceramic body may comprise aluminum raw materials for forming an aluminum titanate ceramic body.

In some embodiments, the green honeycomb ceramic body may be heated from room temperature to the second temperature, or from room temperature to the third temperature, at a single heating rate of greater than or equal to about 90° C./hr.

In some embodiments, heating the green honeycomb ceramic body from room temperature to the first temperature comprises heating at a heating rate of greater than or equal to about 200° C./hr.

In some embodiments, heating the green honeycomb ceramic body from room temperature to the first temperature comprises heating the green honeycomb ceramic body from room temperature to a temperature of from about 90° C. to about 200° C. at a heating rate of from about 130° C./hr to about 170° C./hr, and heating the green honeycomb ceramic body from the temperature of from about 90° C. to about 200° C. to the first temperature at a heating rate less than or equal to about 15° C./hr.

In some embodiments, heating the green honeycomb ceramic body from room temperature to the first temperature comprises heating the green honeycomb ceramic body from room temperature to a temperature of from about 90° C. to about 110° C. at a heating rate of from about 70° C./hr to about 90° C./hr, heating the green honeycomb ceramic body from the temperature of from about 90° C. to about 110° C. to a temperature of from about 140° C. to about 160° C. at a heating rate of from about 40° C./hr to about 60° C./hr, heating the green honeycomb ceramic body from the temperature of from about 140° C. to about 160° C. to a temperature of from about 190° C. to about 210° C. at a heating rate of from about 15° C./hr to about 35° C./hr, and heating the green honeycomb ceramic body from the temperature of from about 190° C. to about 210° C. to the first temperature at a heating rate of less than or equal to about 15° C./hr.

Additional features and advantages of this disclosure will be set forth in the detailed description which follows, and in part will be readily apparent to those skilled in the art from that description or recognized by practicing the embodiments described herein, including the detailed description which follows and the claims.

It is to be understood that both the foregoing general description and the following detailed description describe various embodiments and are intended to provide an overview or framework for understanding the nature and character of the claimed subject matter.

DETAILED DESCRIPTION

Reference will now be made in detail to embodiments of firing cycles for firing green honeycomb ceramic bodies. In accordance with embodiments, a method of firing green honeycomb ceramic bodies includes heating the green honeycomb ceramic body in a kiln in four stages. In embodiments, the first stage comprises heating the green honeycomb ceramic body from room temperature to a first temperature of less than or equal to about 350° C. at one or more heating rates. In the second stage the green honeycomb ceramic body may be heated from the first temperature to a second temperature at a heating rate that is greater than or equal to about 90° C./hr. In the third stage the green honeycomb ceramic body may be heated from the second temperature to a third temperature at one or more heating rates. The green honeycomb ceramic body may be held at the third temperature for a predetermined amount of time. In the fourth stage the green honeycomb ceramic body may be heated to a maximum soak temperature and held for an amount of time sufficient to remove residual carbon from the green honeycomb ceramic body. The heating rates in the first, second, and third stages may be the same or different. In some embodiments, the heating rates in the first and second stages may vary depending on the size of the ceramic body that is being heated and the amount of oxygen present in the kiln.

In embodiments, the green honeycomb ceramic body may include aluminum containing raw materials, such as alumina, and titanium containing raw materials, such as rutile titania that form an aluminum titanate body when fired. In some embodiments, the aluminum titanate body may have the crystal structure of pseudobrookite. The amount of aluminum titanate is greater than 30% of the ceramic body.

In some embodiments, the raw materials may include a magnesium-containing material, such as, for example, talc or MgO. The magnesium-containing material may be added to the raw materials to form magnesium titanate, which is in solid solution with the aluminum titanate, such that the magnesium titanate forms approximately 20% of the pseudobrookite phase. The amount of aluminum titanate and magnesium titanate together is between 50-100% of the ceramic body. In other embodiments, the raw materials may not include a magnesium-containing material, such that the aluminum titanate in the pseudobrookite phase is greater than 95% of the psuedobrookite phase.

In embodiments, the composition may have a superaddition load of extrusion aids, binders, and pore formers from about 10% to about 55% or even from about 15% to about 50%. The formed honeycomb ceramic bodies may have high porosities. In embodiments, the porosity of the honeycomb ceramic bodies may be from about 40% to about 65%, such as from about 45% to about 65%. In some embodiments, the porosity of the honeycomb ceramic body may be from about 50% to about 65%, such as about 60%.

The composition may include one or more carbon-based pore formers. In embodiments, the pore formers may be selected from starch, graphite, engineered polymeric materials, or mixtures thereof. In embodiments, the total amount of pore former superaddition included in the composition may be from greater than or equal to about 10% by weight to less than or equal to about 50% by weight of the composition. In some embodiments, the total amount of the pore former may be from greater than or equal to about 20% by weight to less than or equal to about 34% by weight of the composition. In embodiments comprising a mixture of starch and graphite, the starch may be included in the composition in an amount from greater than or equal to about 10% by weight to an amount less than or equal to about 30% by weight of the composition, and the graphite may be included in an amount from greater than or equal to 0% by weight to less than or equal to about 16% by weight of the composition. However, it should be understood that any combination of graphite and starch may be used according to embodiments.

The weight percentages of the pore former are calculated as superadditions with respect to the non-organic solids by the following formula:

$$\frac{\text{Weight of Pore Former}}{\text{Weight of Non-Organic Solids}} \times 100.$$

As will be discussed below, the desired size of the honeycomb ceramic body may affect the heating rates within each of the three stages. In embodiments, lower heating rates may be used on larger green honeycomb ceramic bodies, and higher heating rates may be used on smaller green honeycomb ceramic bodies. In some embodiments, multiple heating rates may be used in the first stage to help minimize cracking the green honeycomb ceramic body during the first stage of the process. In embodiments, the diameter of the honeycomb ceramic body may be from greater than or equal to about 4.0 inches to less than or equal to about 9.0 inches, or even from greater than or equal to about 6.3 inches to less than or equal to about 7.5 inches. In embodiments, the diameter of the honeycomb ceramic body may be from greater than or equal to about 5.5 inches to less than or equal to about 6.0 inches. In some embodiments, the honeycomb ceramic body may have a diameter of about 4.66 inches and a length of about 9.0 inches, or a diameter of about 5.66 inches and a length of about 6.0 inches. In other embodiments, the honeycomb ceramic body may have a diameter of about 5.66 inches and a length of about 7.5 inches, or a diameter of about 6.3 inches and a length of about 6.5 inches. In another embodiment, the honeycomb ceramic body may have a diameter of about 7.5 inches and a length of about 6.5 inches.

First Stage

In embodiments, the first stage of the firing method may include heating a green honeycomb ceramic body from room temperature to a first temperature of less than or equal to about 350° C. In some embodiments, the first temperature may be less than or equal to about 300° C., or even less than or equal to about 280° C. In some embodiments, the first temperature may be greater than or equal to about 240° C. It should be understood that, as used herein, room temperature is not particularly limited and may include any ambient temperature of the ceramic body and/or kiln prior to commencement of the first stage of the firing method.

Figure 1:
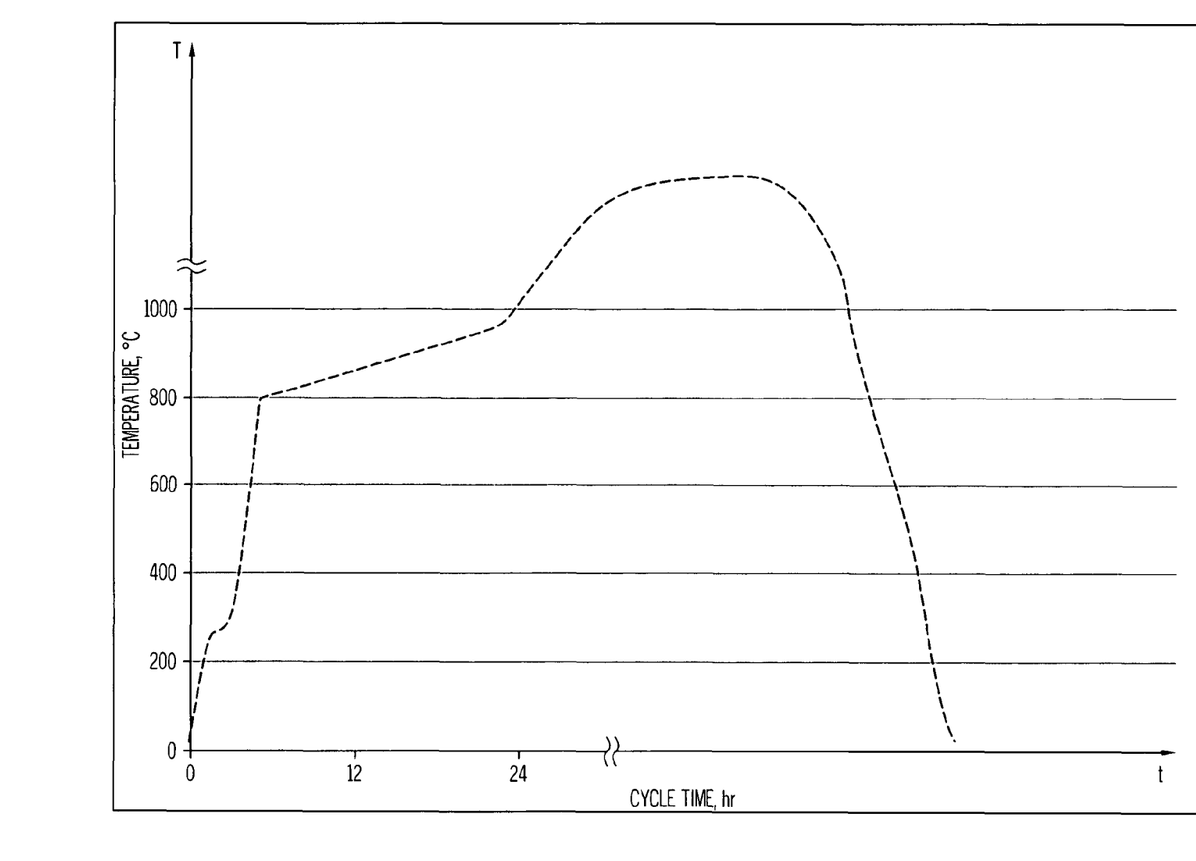
FIG. 1 graphically depicts heating rates of a cycle according to an embodiment of the present disclosure.

According to some embodiments, the first stage may comprise one heating rate; however, in other embodiments, the first stage may comprise multiple heating rates. FIG. 1 graphically depicts an embodiment where the heating cycle comprises more than one heating rate in the first stage. Particularly, FIG. 1 shows a heating rate decrease as the temperature approaches the first temperature. However, some embodiments, not depicted in FIG. 1 may have one heating rate in the first stage or more than two heating rates in the first stage. In some embodiments, not shown in FIG. 1, the heating rate may increase as it approaches the first temperature. At least one heating rate used in the first stage may be sufficiently high to avoid cracking of the honeycomb ceramic body. In embodiments, at least one heating rate used in the first stage may be greater than or equal to about 80° C./hr. For example, in some embodiments a heating rate used in the first stage may be greater than or equal to about 90° C./hr, or even greater than or equal to about 150° C./hr. In embodiments, a heating rate used in the first stage may be less than or equal to about 300° C./hr, or even less than or equal to about 200° C./hr. In some embodiments, a heating rate used in the first stage may be about 80° C./hr, about 90° C./hr, or about 150° C./hr. In some embodiments, a heating rate used in the first stage may be about 200° C./hr, or about 300° C./hr.

According to some embodiments, more than one heating rate may be used in the first stage. Using more than one heating rate in the first stage may allow for better control of the temperature change of the green honeycomb ceramic body during the first stage. Thus, using multiple heating rates in the first stage may reduce the amount of cracking in the ceramic body.

According to some embodiments where the first stage comprises two or more heating rates, the green honeycomb ceramic body may be heated from room temperature to a temperature of from about 245° C. to about 265° C., or even heated from room temperature to a temperature of from about 250° C. to about 260° C. In some embodiments, the green honeycomb ceramic body may be heated from room temperature to the temperature of from about 245° C. to about 265° C. at a heating rate that is from about 180° C./hr to about 220° C./hr, such as about 200° C./hr.

In some embodiments, the green honeycomb ceramic body may be heated from the temperature of from about 245° C. to about 265° C. to the first temperature at a heating rate less than or equal to about 15° C./hr. In some embodiments, the green honeycomb ceramic body may be heated from the temperature of from about 245° C. to about 265° C. to the first temperature at a heating rate less than or equal to about 7° C./hr, or even at a heating rate of about 5° C./hr. In some embodiments, the first temperature may be less than or equal to about 350° C., or even less than or equal to about 280° C. In some embodiments, the first temperature may be greater than or equal to about 270° C., or even greater than or equal to about 275° C.

In some embodiments the green honeycomb ceramic body may be heated from room temperature to a temperature of from about 90° C. to about 200° C. In some embodiments the green honeycomb ceramic body may be heated from room temperature to a temperature of from about 90° C. to about 110° C., such as a temperature of about 100° C. In some embodiments the green honeycomb ceramic body may be heated from room temperature to a temperature of from about 180° C. to about 200° C., such as a temperature of about 190° C. In some embodiments, the green honeycomb ceramic body may be heated from room temperature to the temperature of from about 90° C. to about 200° C. at a heating rate that is from about 130° C./hr to about 170° C./hr, such as a heating rate of about 150° C./hr.

In some embodiments, the green honeycomb ceramic body may be heated from the temperature of from about 90° C. to about 110° C. to the first temperature at a heating rate of less than or equal to about 15° C./hr. In some embodiments, the first temperature may be less than or equal to about 300° C., such as about 270° C.

In some embodiments the first stage may comprise three heating rates, and the green honeycomb ceramic body may be heated from room temperature to a temperature of from about 180° C. to about 200° C., such as about 190° C. The green honeycomb ceramic body may be heated from room temperature to the temperature of from about 180° C. to about 200° C. at a heating rate that is from about 130° C./hr to about 170° C./hr, such as a heating rate of about 150° C./hr. The green honeycomb ceramic body may then be heated from the temperature of from about 180° C. to about 200° C. to a temperature of from about 200° C. to about 220° C., such as about 210° C. The green honeycomb ceramic body may be heated from the temperature of from about 180° C. to about 200° C. to a temperature of from about 200° C. to about 220° C. at a heating rate of less than or equal to about 15° C./hr. According to some embodiments, the green honeycomb ceramic body may be heated from the temperature of from about 200° C. to about 220° C. to the first temperature at a heating rate of less than or equal to about 5° C./hr, such as a heating rate of about 3° C./hr. In some embodiments, the first temperature may be less than about 300° C., or even less than about 250° C. In some embodiments, the first temperature may be greater than or equal to about 240° C.

In some embodiments, the first stage may comprise more than three heating rates. In such embodiments, green honeycomb ceramic body may be heated from room temperature to a temperature of from about 90° C. to about 110° C., such as about 100° C. The green honeycomb ceramic body may be heated to the temperature of from about 90° C. to about 110° C. at a heating rate of from about 70° C./hr to about 90° C./hr, such as a heating rate of about 80° C./hr. The green honeycomb ceramic body may be heated from the temperature of from about 90° C. to about 110° C. to a temperature of from about 140° C. to about 160° C., such as a temperature of about 150° C. The green honeycomb ceramic body may be heated to the temperature of from about 140° C. to about 160° C. at a heating rate of from about 40° C./hr to about 60° C./hr, such as a heating rate of about 50° C./hr. The green honeycomb ceramic body may be heated from the temperature of from about 140° C. to about 160° C. to a temperature of from about 190° C. to about 210° C., such as a temperature of about 200° C. The green honeycomb ceramic body may be heated to the temperature of from about 190° C. to about 210° C. at a heating rate of from about 15° C./hr to about 35° C./hr, such as a heating rate of about 25° C./hr. The green honeycomb ceramic body may be heated from the temperature of from about 190° C. to about 210° C. to the first temperature at a heating rate of from about 5° C./hr to about 20° C./hr, such as a heating rate of about 15° C./hr. The first temperature may be from about 330° C. to about 350° C.

The paragraph below discloses details pertaining to controlling skin defects and cracks in ATHP. We have found that controlling O2 levels to higher temperature is beneficial to preventing skin defects.

As discussed in U.S. Patent Application Ser. No. 61/775, 027 entitled "Fast Firing Method for Ceramics" and filed on Mar. 8, 2013, which is incorporated herein by reference, the heating rate in the first stage may depend on the size of the honeycomb ceramic body that is being fired. For example, small-sized honeycomb ceramic bodies may be heated at high heating rates, while larger honeycomb ceramic bodies may be heated at lower heating rates. According to embodiments, using relatively high first stage heating rates may promote crack-free firing. Heating rates in the first stage may be very high in comparison to known firing methods. These higher heating rates differ from conventional understanding, where such high heating rates may have been expected to cause cracking due to increased thermal gradients. Without being bound to any specific theory, such high thermal gradients may be reached without cracking because the high heating rates in combination with low oxygen access (either through low $O_2$ in the kiln or reduced reaction time) may suppress binder and pore former reactions that could lead to shrinkage. Therefore, the impact of high thermal gradients may be minimized due to low differential shrinkage. Additionally, the high heating rates may also promote uniform reactions through green bodies. At lower heating rates, green bodies may show high oxygen reaction pathways for the skin portion and low oxygen reaction pathways for the core portions. This may also contribute to low differential shrinkage within the green body during the first stage. Even if cracking is avoided in the first stage, this does not eliminate susceptibility to cracking in subsequent stages. Subsequent stages may need to be managed through more conventional means, such as different heating rates and $O_2$ level control. Further, the size of the honeycomb ceramic body that is being fired may be taken into account to help control cracking and to modify heating rates.

It should be understood that large temperature differentials (ΔT) between the surface of a honeycomb ceramic body and the core of a honeycomb ceramic body may increase stresses and, thus, increase the likelihood that the honeycomb ceramic body will crack. High stresses in the honeycomb ceramic body may occur at kiln temperatures where ΔT is at a maximum. However, stresses in the honeycomb ceramic body may not be significantly large in the first stage of the method for firing the honeycomb ceramic body and, thus, high heating rates and thermal gradients may be used in the first stage of the firing method without introducing large amounts of stress which may ultimately crack the body.

In some embodiments where the green honeycomb ceramic body comprises magnesium-containing materials, the first stage may comprise one heating rate or more than one heating rate. In some embodiments where the green honeycomb ceramic body does not comprise magnesium-containing materials, the first stage may comprise one heating rate, two heating rates, or more than two heating rates. The oxygen level of the atmosphere within the kiln during the first stage may be kept low. Theoretically, using a high heating rate in the first stage may allow higher amounts of oxygen to be present in the first stage of the firing methods described herein compared to conventional firing processes for honeycomb ceramic bodies. Rapid heating of the green honeycomb ceramic body in the first stage, according to embodiments, may not allow oxygen to react with residual elements in the green honeycomb ceramic body before the temperature of the green honeycomb ceramic body reaches the temperatures of the second or third stages. In some embodiments, the amount of oxygen in the atmosphere of the kiln in the first stage may be from about 1% by volume to about 13% by volume, or even from about 3% by volume to about 10% by volume. The amount of oxygen in the atmosphere of the kiln in the first stage is generally lower than an amount of oxygen used in a conventional firing processes for honeycomb ceramic bodies.

Oxygen levels in the atmosphere of the kiln may be controlled by any suitable means. In embodiments, the level of oxygen in the atmosphere of the kiln may be modified by injecting oxygen into the kiln. In other embodiments, the level of oxygen in the atmosphere of the kiln may be modified by using different types of setters. For example, in some embodiments, the setter may be composed of silicon carbide. In other embodiments, the setter may be composed of the same material as the green honeycomb ceramic body that is being fired. The geometry of the setter may also contribute to the oxygen levels in the atmosphere of the kiln. For example, in embodiments, the setter may be a solid plate having any suitable thickness. In other embodiments, the setter may be a plate having holes formed therein; the holes may be present in any suitable number or any suitable geometry. In yet other embodiments, the setter may be ring shaped. It should be understood that other setter compositions and geometries may be used without deviating from the scope of this disclosure.

Second Stage

In embodiments, the second stage of the firing method may include heating the green honeycomb ceramic body from the maximum temperature reached in the first stage to a second temperature of greater than or equal to about 800° C. In some embodiments, the second temperature may less than or equal to about 1000° C. In some embodiments where the green honeycomb ceramic body comprises magnesium containing materials, the first stage may end at about 800° C. In some embodiments where the green honeycomb ceramic body does not comprise magnesium containing materials, the first stage may end at about 1000° C.

The heating rate in the second stage may depend on the size of the honeycomb ceramic body that is being fired. As previously discussed, larger honeycomb ceramic bodies may likely have a larger ΔT, while smaller honeycomb ceramic bodies may likely have a smaller ΔT at an identical heating rate. Although stresses and ΔT in the honeycomb ceramic body may be higher in the second stage than in the first stage, stresses and ΔT may not be significantly large in the second stage and, thus, according to embodiments relatively high heating rates may still be used in the second stage of the firing method, particularly when smaller-sized honeycomb ceramic bodies are being fired. In some embodiments, the heating rate in the second stage may be greater than or equal to about 90° C./hr, or even greater than or equal to about 150° C./hr. In some embodiments, the heating rate in the second stage may be less than or equal to about 300° C./hr, or even less than or equal to about 200° C./hr. In some embodiments, the heating rate in the second stage may be from about 180° C./hr to about 220° C./hr, such as about 200° C./hr.

The heating rate in the second stage may be greater than or equal to the maximum heating rate in the first stage. For example, the embodiment graphically depicted in FIG. 1 shows a heating rate in the second stage that is approximately equal to the maximum heating rate in the first stage. Thus, in embodiments with only one heating rate in the first stage, the heating rate in the second stage may be identical to the heating rate in the first stage. Accordingly, in some embodiments, the green honeycomb ceramic body may be heated from room temperature to the second temperature at a single heating rate. In other embodiments, the second stage heating rate may be greater than the maximum heating rate in the first stage.

The amount of oxygen in the atmosphere of the kiln during the second stage is not particularly limited, and may be set to ambient conditions. In some embodiments, the amount of oxygen in the atmosphere of the kiln during the second stage may be from about 3% to about 15% by volume, or even from about 6% to about 12% by volume. In some embodiments, the amount of oxygen in the atmosphere of the kiln during the second stage may from about 7% to about 10% by volume. The level of oxygen may be increased during the second stage. For example, in some embodiments, the oxygen level in the atmosphere of the kiln may be at about 3%, or even about 6%, by volume at the beginning of the second stage (e.g., at the first temperature). Oxygen may then be allowed to enter into the kiln during heating so that the oxygen level in the atmosphere of the kiln may be from about 10% to about 15% by volume, such as about 12% by volume, when the temperature in the kiln reaches about 600° C.

Third Stage

In embodiments, the third stage of the firing method described herein may include heating the green honeycomb ceramic body from the second temperature to a third temperature. The third temperature may be greater than or equal to about 1000° C. In some embodiments, the third temperature may be less than or equal to about 1200° C.

The highest stresses in the honeycomb ceramic body and the highest ΔT may occur within the temperature ranges of the third stage. Thus, in embodiments, heating rates in the third stage may be sufficiently lower than heating rates in the first and second stages to decrease the rate of change in ΔT and, thereby, reduce stresses that may cause cracking of the honeycomb ceramic body. However in other embodiments, the heating rate used in the third stage may be the same as the heating rate used in the second stage. Thus, in embodiments where the first stage and the second stage use the same heating rate, the green honeycomb ceramic body may be heated from room temperature to the third temperature at a single heating rate.

The heating rate in the third stage may be sufficient to remove carbonaceous material remaining in the green honeycomb ceramic body after it has been heated to the second temperature. In embodiments, a heating rate used in the third stage may be less than a heating rate used in the first and second stages. For example, in the embodiment graphically depicted in FIG. 1, the heating rate in the third stage is less than the maximum heating rates in both the first stage and the second stage. In embodiments, the heating rate in the third stage may be less than or equal to about 150° C./hr, or even less than or equal to about 90° C./hr. In some embodiments, the heating rate in the third stage may be less than or equal to about 15° C./hr. In some embodiments, the heating rate in the third stage may be greater than or equal to about 5° C./hr, or even greater than or equal to about 7° C./hr. In some other embodiments, the heating rate in the third stage may be about 150° C./hr, about 90° C./hr, or about 7° C./hr.

In embodiments where the green honeycomb ceramic body comprises magnesium-containing materials, the heating rate in the third stage may be less than the maximum heating rate in the first stage, and the heating rate in the third stage may be greater than or equal to the minimum heating rate in the first stage. In embodiments where the green honeycomb ceramic body comprises magnesium-containing materials, the heating rate in the third stage may be less or equal to about 15° C./hr, such as about 7° C./hr. In some embodiments where the green honeycomb ceramic body does not comprise magnesium-containing materials, the heating rate in the third stage may greater than or equal to about 90° C./hr and less than or equal to about 150° C./hr with a subsequent slow down at temperatures >1000° C. to burn out the carbonaceous material.

The size of the honeycomb ceramic body does not necessarily affect the heating rate in the third stage, thus all sizes of honeycomb ceramic bodies may be heated at the same heating rate during the third stage. However, the heating rate in the third stage may be lower for larger honeycomb ceramic bodies than for smaller honeycomb ceramic bodies to decrease a rate of change in ΔT, which, as discussed above, may be larger for large honeycomb ceramic bodies. For example, the maximum heating rate in the third stage for a ceramic body having a length of greater than or equal to about 7.5 inches may be about 90° C./hr. In embodiments where the length of the ceramic body is less than about 7.5 inches, the maximum heating rate in the third stage may be less than or equal to about 150° C./hr.

In some embodiments, the heating rate in the third stage may be at a low level (i.e., at or below a heating rate in the first stage) such that oxygen levels in the atmosphere of the kiln in the third stage are not particularly limited and may be at ambient levels. Accordingly, in embodiments, the amount of oxygen in the atmosphere of the kiln during the third stage may be from about 8% to about 21% by volume, such as about 13% by volume.

In some embodiments, the third stage may include an isothermal hold of the honeycomb ceramic body at the third temperature. In some embodiments, the honeycomb ceramic body may be held at the third temperature for from about 8 hours to about 14 hours, such as about 11 hours.

In some embodiments, the third stage may include heating the honeycomb ceramic body from the third temperature to a temperature of from greater than or equal to about 1100° C. to a temperature of less than or equal to about 1200° C., such as a temperature of about 1150° C. The honeycomb ceramic body may be heated to the temperature of from greater than or equal to about 1100° C. to a temperature of less than or equal to about 1200° C. at a heating rate of from greater than or equal to about 7° C./hr to less than or equal to about 12° C./hr, such as a heating rate of about 9° C./hr.

Fourth Stage

In embodiments, the fourth stage of the firing method may include heating the honeycomb ceramic body from the maximum temperature in the third stage to a maximum soak temperature. In some embodiments, the maximum soak temperature may be greater than about 1200° C. or even greater than about 1300° C. In some embodiments, the maximum soak temperature may be less than or equal to about 1500° C., or even less than or equal to about 1400° C. The honeycomb ceramic body may be held at the maximum soak temperature for a predetermined length of time. The duration of the hold at the maximum soak temperature is not particularly limited and may be as long as required to form appropriate properties. After it is heated to the maximum soak temperature, the honeycomb ceramic body may be cooled to room temperature at ambient conditions. This cooling may be conducted by removing the honeycomb ceramic body from the heating apparatus, or by allowing ambient air to flow in and/or through the kiln.

For the purposes of describing and defining the embodiments herein, it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

As used herein, when directed to a measurement in inches, the term "about" may include at least the stated measurement ±0.25 inches.

References herein to temperatures and heating rates refer to the atmospheric temperature within the heating apparatus. As used herein, when directed to temperatures, the term "about" may include at least the stated temperature ±10° C.

As used herein, when directed to heating rates, the term "about" may include at least the stated heating rate ±10%.

As used herein, when directed to percentages, the term "about" may include at least the stated percentage ±3%.

EXAMPLES

Embodiments will be further clarified by the following examples.

Examples 1-16

In the examples below, cylindrical honeycomb ceramic bodies having diameters and lengths indicated in Table 1 below were heated in a kiln at heating rates indicated in Table 1. Further, the amount of oxygen used in each stage and the amount of pore formers used is listed in Table 1. Each of Examples 1-5 was formed with aluminum containing raw materials that did not include a magnesium-containing material. Examples 6-16 were formed with aluminum containing raw materials that included talc, a magnesium-containing material. The honeycomb ceramic bodies were using aluminum titanate compositions as described in U.S. Pat. No. 7,976,768 issued on Jul. 12, 2011, which is incorporated herein by reference in its entirety.

TABLE 1

| | Heating Rate | | | Oxygen Level (%) | | | Part | | | |
|---|---|---|---|---|---|---|---|---|---|---|
| Ex | RT-First Temp (° C./hr) | First Temp-Second Temp (° C./hr) | Third Temp and Above | First Temp and Below | First Temp-Second Temp | Third Temp and Above | Size | Porosity (%) | Starch (%) | Graphite (%) |
| 1 | RT-100° C.: 80° C./hr 100° C.-150° C.: 50° C./hr 150° C.-200° C.: 25° C./hr 200° C.-350° C.: 15° C./hr | 350° C.-800° C.: 90° C./hr | 800° C.-1000° C.: 90° C./hr 1000° C.-1150° C.: 9° C./hr | 8 | Ramp from 10 to 12 | 13 | 6.5" × 6.5" 7.5" × 6.5" 6.5" × 6.5" 5.66" × 7.5" 4.66" × 9" | 60 58 | 24 19 | 5 8 |
| 2 | RT-300° C.: 90° C./hr | 300° C.-800° C.: 90° C./hr | 800° C.-1000° C.: 90° C./hr | 6 | Ramp from 6 to 12 | 12 | 5.66" × 6" 7.5" × 6.5" 6.5" × 6.5" | 60 51 46 | 20 8 8 | 8 10 3.5 |
| 3 | RT-300° C.: 90° C./hr | 300° C.-800° C.: 90° C./hr | 800° C.-1000° C.: 90° C./hr | 10 | Ramp from 10 to 12 | 13 | 5.66" × 6" 7.5" × 6.5" 6.5" × 6.5" | 58 58 45 | 20 20 8 | 8 8 3.5 |
| 4 | RT-300° C.: 150° C./hr | 300° C.-800° C.: 150° C./hr | 800° C.-1000° C.: 150° C./hr | 6 | Ramp from 6 to 12 | 12 | 5.66" × 6" 7.5" × 6.5" 6.5" × 6.5" | 60 51 46 | 20 8 8 | 8 10 3.5 |
| 5 | RT-300° C.: 300° C./hr | 300° C.-800° C.: 300° C./hr | 800° C.-1000° C.: 150° C./hr | 6 | Ramp from 6 to 12 | 12 | 5.66" × 6" 7.5" × 6.5" 6.5" × 6.5" | 60 51 46 | 20 8 8 | 8 10 3.5 |
| 6 | RT-250° C.: 200° C./hr 250° C.-350° C.: 5° C./hr | 350° C.-800° C.: 200° C./hr | 800° C.-1000° C.: 7° C./hr | 3 | 3 | 13 | 7.5" × 6.5" | 61 | 32 | 14 |
| 7 | RT-250° C.: 200° C./hr 250° C.-280° C.: 5° C./hr | 280° C.-800° C.: 200° C./hr | 800° C.-1000° C.: 7° C./hr | 3 | Ramp from 3 to 12 | 13 | 7.5" × 6.5" 7.5" × 6.5" | 59 62 | 30 32 | 10 14 |
| 8 | RT-261° C.: 200° C./hr 261° C.-274° C.: 7° C./hr | 274° C.-800° C.: 200° C./hr | 800° C.-1000° C.: 7° C./hr | 3 | Ramp from 3 to 12 | 13 | 7.5" × 6.5" 7.5" × 6.5" 6.5" × 6.5" 6.5" × 6.5" | 59 62 59 62 | 30 32 30 32 | 10 14 10 14 |
| 9 | RT-260° C.: 200° C./hr 260° C.-280° C.: 7° C./hr | 280° C.-800° C.: 200° C./hr | 800° C.-1000° C.: 7° C./hr | 3 | Ramp from 3 to 12 | 13 | 6.5" × 6.5" 6.5" × 6.5" 6.5" × 6.5" | | 31 28.5 28 | 12 14 10 |
| 10 | RT-100° C.: 150° C./hr 100° C.-270° C.: 7° C./hr | 270° C.-800° C.: 200° C./hr | 800° C.-1000° C.: 7° C./hr | 3 | Ramp from 3 to 12 | 13 | 6.5" × 6.5" 6.5" × 6.5" 6.5" × 6.5" 6.5" × 6.5" 6.5" × 6.5" | 60 59 60 61 60 | 30 33 28.5 31 28 | 14 9 14 12 10 |
| 11 | RT-100° C.: 150° C./hr 100° C.-270° C.: 7° C./hr | 270° C.-800° C.: 200° C./hr | 800° C.-1000° C.: 7° C./hr | 6 | Ramp from 6 to 12 | 13 | 6.5" × 6.5" 6.5" × 6.5" 6.5" × 6.5" 6.5" × 6.5" 6.5" × 6.5" | 60 59 60 61 60 | 30 33 28.5 31 28 | 14 9 14 12 10 |
| 12 | RT-190° C.: 150° C./hr 190° C.-210° C.: 15° C./hr 210° C.-240° C.: 5° C./hr | 240° C.-800° C.: 200° C./hr | 800° C.-1000° C.: 7° C./hr | 3 | Ramp from 3 to 12 | 13 | 6.5" × 6.5" 6.5" × 6.5" | 61 62 | 28 28 | 8 12 |
| 13 | RT-190° C.: 150° C./hr 190° C.-210° C.: 15° C./hr 210° C.-240° C.: 5° C./hr | 240° C.-800° C.: 200° C./hr | 800° C.-1000° C.: 7° C./hr | 7 | Ramp from 7 to 12 | 13 | 6.5" × 6.5" 6.5" × 6.5" | 61 62 | 28 28 | 8 12 |
| 14 | RT-190° C.: 150° C./hr 190° C.-210° C.: 15° C./hr 210° C.-240° C.: 3° C./hr | 240° C.-800° C.: 200° C./hr | 800° C.-1000° C.: 7° C./hr | 3 | Ramp from 3 to 12 | 13 | 6.5" × 6.5" 6.5" × 6.5" | 61 62 | 28 28 | 8 12 |
| 15 | RT-190° C.: 150° C./hr 190° C.-210° C.: 15° C./hr 210° C.-240° C.: 3° C./hr | 240° C.-800° C.: 200° C./hr | 800° C.-1000° C.: 7° C./hr | 7 | Ramp from 7 to 12 | 13 | 6.5" × 6.5" 6.5" × 6.5" | 61 62 | 28 28 | 8 12 |
| 16 | RT-190° C.: 150° C./hr | 240° C.-800° C.: 200° C./hr | 800° C.-1000° C.: 7° C./hr | 10 | Ramp from 10 to 12 | 13 | 6.5" × 6.5" | 61 | 28 | 8 |

TABLE 1-continued

| | Heating Rate | | | Oxygen Level (%) | | | Part | | | |
|---|---|---|---|---|---|---|---|---|---|---|
| Ex | RT-First Temp (° C./hr) | First Temp-Second Temp (° C./hr) | Third Temp and Above | First Temp and Below | First Temp-Second Temp | Third Temp and Above | Size | Porosity (%) | Starch (%) | Graphite (%) |
| | 190° C.-210° C.: 15° C./hr 210° C.-240° C.: 3° C./hr | | | | | | 6.5" × 6.5" | 62 | 28 | 12 |

Each of the honeycomb ceramic bodies formed in accordance with the parameters shown in Table 1 above was fired without substantial cracking and at fast firing rates.

It will be apparent to those skilled in the art that various modifications and variations may be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for firing a green honeycomb ceramic body, the method comprising:
   heating the green honeycomb ceramic body from room temperature to a first temperature of less than or equal to about 350° C., wherein heating the green honeycomb ceramic body from room temperature to the first temperature comprises a heating rate of greater than or equal to about 80° C./hr;
   heating the green honeycomb ceramic body from the first temperature to a second temperature of greater than or equal to about 800° C., wherein heating the green honeycomb ceramic body from the first temperature to the second temperature comprises a heating rate of greater than or equal to about 90° C./hr; and
   heating the green honeycomb ceramic body from the second temperature to a third temperature of greater than or equal to about 1000° C.,
   wherein the green honeycomb ceramic body has a diameter of from greater than or equal to about 4.0 inches to less than or equal to about 9.0 inches,
   wherein the green honeycomb ceramic body comprises a carbon-based pore former in a concentration of from greater than or equal to about 10% to less than or equal to about 48% by weight,
   wherein the green honeycomb ceramic body comprises aluminum raw materials for forming an aluminum titanate ceramic body, and
   wherein heating the green honeycomb ceramic body from room temperature to the first temperature comprises at least one heating rate that is different from a heating rate during heating of the green honeycomb ceramic body from the first temperature to the second temperature.

2. The method of claim 1, wherein heating the green honeycomb ceramic body from room temperature to the first temperature comprises:
   heating the green honeycomb ceramic body to a temperature of from about 245° C. to about 265° C. at a heating rate of from about 180° C./hr to about 220° C./hr; and
   heating the green honeycomb ceramic body from the temperature of about 245° C. to about 265° C. to the first temperature at a heating rate less than or equal to about 15° C./hr.

3. The method of claim 2, wherein heating the green honeycomb ceramic body from the first temperature to the second temperature comprises heating the green honeycomb ceramic body at a heating rate of from about 180° C./hr to about 220° C./hr.

4. The method of claim 3, wherein heating the green honeycomb ceramic body from the second temperature to the third temperature comprises heating the green honeycomb ceramic body at a heating rate of less than or equal to about 15° C./hr.

5. The method of claim 2, wherein the green honeycomb ceramic body has a diameter of from greater than or equal to about 6.3 inches to less than or equal to about 7.5 inches.

6. The method of claim 2, wherein the green honeycomb ceramic body comprises a carbon-based pore former in a concentration of from greater than or equal to about 34% to less than or equal to about 48% by weight by superaddition.

7. The method of claim 2, the raw materials for forming the green honeycomb ceramic body comprise magnesium-containing material.

8. The method of claim 2, wherein an atmosphere of a kiln comprises from about 3% to about 15% by volume of oxygen during the firing.

9. The method of claim 1, wherein heating the green honeycomb ceramic body from room temperature to the first temperature comprises:
   heating the green honeycomb ceramic body from room temperature to a temperature of from about 90° C. to about 200° C. at a heating rate of from about 130° C./hr to about 170° C./hr; and
   heating the green honeycomb ceramic body from the temperature of from about 90° C. to about 200° C. to the first temperature at a heating rate less than or equal to about 15° C./hr.

10. The method of claim 9, wherein heating the green honeycomb ceramic body from the first temperature to the second temperature comprises heating the green honeycomb ceramic body at a heating rate of from about 180° C./hr to about 220° C./hr.

11. The method of claim 9, wherein heating the green honeycomb ceramic body from the second temperature to the third temperature comprises heating the green honeycomb ceramic body at a heating rate of less than or equal to about 15° C./hr.

12. The method of claim 9, wherein the green honeycomb ceramic body has a diameter of about 6.3 inches.

13. The method of claim 9, wherein the green honeycomb ceramic body comprises a carbon-based pore former in a concentration of from greater than or equal to about 34% to less than or equal to about 45% by weight by superaddition.

14. The method of claim 9, wherein the raw materials for forming the green honeycomb ceramic body comprises magnesium-containing material.

15. The method of claim 9, wherein heating the green honeycomb ceramic body from room temperature to the first temperature comprises:

heating the green honeycomb ceramic body from room temperature to a temperature of from about 90° C. to about 110° C. at a heating rate of from about 130° C./hr to about 170° C./hr; and heating the green honeycomb ceramic body from the temperature of from about 90° C. to about 110° C. to the first temperature at a heating rate of less than or equal to about 15° C./hr.

16. The method of claim 9, wherein heating the green honeycomb ceramic body from room temperature to the first temperature comprises:

heating the green honeycomb ceramic body from room temperature to a temperature of from about 180° C. to about 200° C. at a heating rate of from about 130° C./hr to about 170° C./hr;

heating the green honeycomb ceramic body from the temperature of from about 180° C. to about 200° C. to a temperature of from about 200° C. to about 220° C. at a heating rate of less than or equal to about 15° C./hr; and heating the green honeycomb ceramic body from the temperature of from about 200° C. to about 220° C. to the first temperature at a heating rate of less than or equal to about 5° C./hr.

17. The method of claim 9, wherein an atmosphere of a kiln comprises from about 3% to about 15% by volume of oxygen during the firing.

18. The method of claim 1, wherein heating the green honeycomb ceramic body from room temperature to the first temperature comprises:

heating the green honeycomb ceramic body from room temperature to a temperature of from about 90° C. to about 110° C. at a heating rate of from about 70° C./hr to about 90° C./hr;

heating the green honeycomb ceramic body from the temperature of from about 90° C. to about 110° C. to a temperature of from about 140° C. to about 160° C. at a heating rate of from about 40° C./hr to about 60° C./hr;

heating the green honeycomb ceramic body from the temperature of from about 140° C. to about 160° C. to a temperature of from about 190° C. to about 210° C. at a heating rate of from about 15° C./hr to about 35° C./hr; and heating the green honeycomb ceramic body from the temperature of from about 190° C. to about 210° C. to the first temperature at a heating rate of less than or equal to about 15° C./hr.

19. The method of claim 18, wherein heating the green honeycomb ceramic body from the second temperature to the third temperature comprises heating the green honeycomb ceramic body at a heating rate of greater than or equal to about 90° C./hr.

20. The method of claim 19, wherein the green honeycomb ceramic body is further heated from the third temperature to a temperature of from about 1100° C. to about 1200° C. at a heating rate of from about 7° C./hr to about 12° C./hr.

21. The method of claim 18, wherein the green honeycomb ceramic body comprises a carbon-based pore former in a concentration of from greater than or equal to about 25% to less than or equal to about 30% by weight by superaddition.

22. The method of claim 18, wherein the raw materials for forming the green honeycomb ceramic body do not comprise magnesium-containing materials.

23. The method of claim 18, wherein an atmosphere of a kiln comprises from about 7% to about 15% by volume of oxygen during the firing.

* * * * *

UNITED STATES PATENT AND TRADEMARK OFFICE
CERTIFICATE OF CORRECTION

PATENT NO. : 9,452,578 B2
APPLICATION NO. : 13/951840
DATED : September 27, 2016
INVENTOR(S) : David Jack Bronfenbrenner et al.

Page 1 of 1

It is certified that error appears in the above-identified patent and that said Letters Patent is hereby corrected as shown below:

On the Title Page

In Column 2, item (56), Foreign Patent Documents, Line 2, delete "203957" and insert -- 2030957 --, therefor.

Signed and Sealed this
Twenty-ninth Day of December, 2020

Andrei Iancu
*Director of the United States Patent and Trademark Office*